(12) United States Patent
Westerman et al.

(10) Patent No.: US 9,111,125 B2
(45) Date of Patent: Aug. 18, 2015

(54) FINGERPRINT IMAGING AND QUALITY CHARACTERIZATION

(71) Applicant: Apple Inc., Cupertino, CA (US)

(72) Inventors: Wayne C. Westerman, Burlingame, CA (US); Karen L. Jenkins, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 13/763,594

(22) Filed: Feb. 8, 2013

(65) Prior Publication Data

US 2014/0226879 A1 Aug. 14, 2014

(51) Int. Cl.
*G06K 9/46* (2006.01)
*G06K 9/00* (2006.01)
*G06K 9/03* (2006.01)

(52) U.S. Cl.
CPC ........ *G06K 9/00013* (2013.01); *G06K 9/00006* (2013.01); *G06K 9/0008* (2013.01); *G06K 9/036* (2013.01)

(58) Field of Classification Search
None
See application file for complete search history.

(56) References Cited

U.S. PATENT DOCUMENTS

| | | | |
|---|---|---|---|
| 3,863,219 A | 1/1975 | Rohrer | |
| 5,828,773 A | 10/1998 | Setlak et al. | |
| 6,323,846 B1 | 11/2001 | Westerman et al. | |
| 6,546,152 B1 | 4/2003 | Hou | |
| 6,570,557 B1 | 5/2003 | Westerman et al. | |
| 6,677,932 B1 | 1/2004 | Westerman | |
| 6,788,340 B1 | 9/2004 | Chen et al. | |
| 6,795,569 B1 | 9/2004 | Setlak et al. | |
| 6,888,536 B2 | 5/2005 | Westerman et al. | |
| 7,110,581 B2 | 9/2006 | Xia et al. | |
| 7,194,115 B2 | 3/2007 | Uchida | |
| 7,401,056 B2 | 7/2008 | Kam | |
| 7,574,022 B2 | 8/2009 | Russo | |
| 7,616,787 B2 | 11/2009 | Boshra | |
| 7,634,117 B2 | 12/2009 | Cho | |
| 7,692,693 B2 | 4/2010 | Misawa | |
| 7,746,375 B2 | 6/2010 | Ketelaars et al. | |
| 7,804,984 B2 | 9/2010 | Sidlauskas et al. | |
| 7,853,053 B2 | 12/2010 | Liu et al. | |
| 7,874,485 B2 | 1/2011 | Meier et al. | |
| 7,876,310 B2 | 1/2011 | Westerman et al. | |
| 7,903,847 B2 | 3/2011 | Higuchi | |

(Continued)

FOREIGN PATENT DOCUMENTS

WO    WO 2012/008168    1/2012
WO    WO 2012/009791    1/2012

OTHER PUBLICATIONS

U.S. Appl. No. 13/797,970, filed Mar. 12, 2013, Westerman et al.

(Continued)

*Primary Examiner* — Mark Roz
(74) *Attorney, Agent, or Firm* — Brownstein Hyatt Farber Schreck, LLP

(57) ABSTRACT

A fingerprint processing system comprises a fingerprint sensor configured to generate an image of a fingerprint, and a processor configured to process the fingerprint image. The processor is operable to generate a ridge flow map comprising ridge flow vectors characterizing the fingerprint, and a multi-layer decomposition based on the ridge flow vectors. The decomposition includes at least first and second-order residuals, based on the ridge flow vectors, and the processor is operable to characterize a quality of the fingerprint image, based on the residuals.

19 Claims, 10 Drawing Sheets

(56) References Cited

U.S. PATENT DOCUMENTS

| | | |
|---|---|---|
| 8,032,758 B2 | 10/2011 | Tian |
| 8,077,935 B2 | 12/2011 | Geoffroy et al. |
| 8,090,163 B2 * | 1/2012 | Schuckers et al. ............ 382/125 |
| 8,125,543 B2 | 2/2012 | Cho |
| 8,131,026 B2 | 3/2012 | Benkley et al. |
| 8,145,656 B2 | 3/2012 | Shatz et al. |
| 8,154,628 B2 | 4/2012 | Ishida et al. |
| 8,170,346 B2 | 5/2012 | Ludwig |
| 8,180,118 B2 | 5/2012 | Neil et al. |
| 8,300,904 B2 | 10/2012 | Chen et al. |
| 8,358,815 B2 | 1/2013 | Benkley et al. |
| 8,408,456 B2 | 4/2013 | Weintraub et al. |
| 8,515,139 B1 | 8/2013 | Nechyba et al. |
| 8,605,960 B2 | 12/2013 | Orsley |
| 8,631,243 B2 | 1/2014 | Baldan et al. |
| 8,705,813 B2 | 4/2014 | Matsuyama et al. |
| 8,837,786 B2 | 9/2014 | Hwang et al. |
| 8,897,568 B2 | 11/2014 | Miyano |
| 2002/0012455 A1 | 1/2002 | Benckert |
| 2010/0266169 A1 * | 10/2010 | Abiko ........................... 382/124 |
| 2011/0274356 A1 | 11/2011 | Tasdizen et al. |
| 2011/0279664 A1 | 11/2011 | Schneider et al. |
| 2012/0045138 A1 | 2/2012 | Cote |
| 2013/0004096 A1 | 1/2013 | Goh et al. |
| 2013/0053107 A1 | 2/2013 | Kang et al. |
| 2013/0083074 A1 | 4/2013 | Nurmi et al. |
| 2013/0272586 A1 | 10/2013 | Russo |
| 2013/0294660 A1 | 11/2013 | Heilpern |
| 2013/0308838 A1 | 11/2013 | Westerman et al. |
| 2014/0003677 A1 | 1/2014 | Han et al. |
| 2014/0056493 A1 | 2/2014 | Gozzini |
| 2014/0212010 A1 | 7/2014 | Han et al. |
| 2014/0241595 A1 | 8/2014 | Bernstein et al. |
| 2014/0267659 A1 | 9/2014 | Lyon et al. |

OTHER PUBLICATIONS

U.S. Appl. No. 13/798,025, filed Mar. 12, 2013, Han et al.
U.S. Appl. No. 13/843,119, filed Mar. 15, 2013, Lyon et al.
U.S. Appl. No. 13/843,457, filed Mar. 15, 2013, Vieta et al.
U.S. Appl. No. 14/244,143, filed Apr. 3, 2014, Han et al.
Author Unknown, "Fingerprint Recognition," National Science and Technology Council (NSTC), Committee on Technology, Committee on Homeland and National Security, Subcommittee on Biometrics, Aug. 7, 2006, 13 pages.
Rajanna et al., "A comparative study on feature extraction for fingerprint classification and performance improvements using rank-level fusion," *Pattern Anal. Applic.*, published online Apr. 28, 2009, DOI 10.1007/s10044-009-0160-3, 10 pages.

* cited by examiner

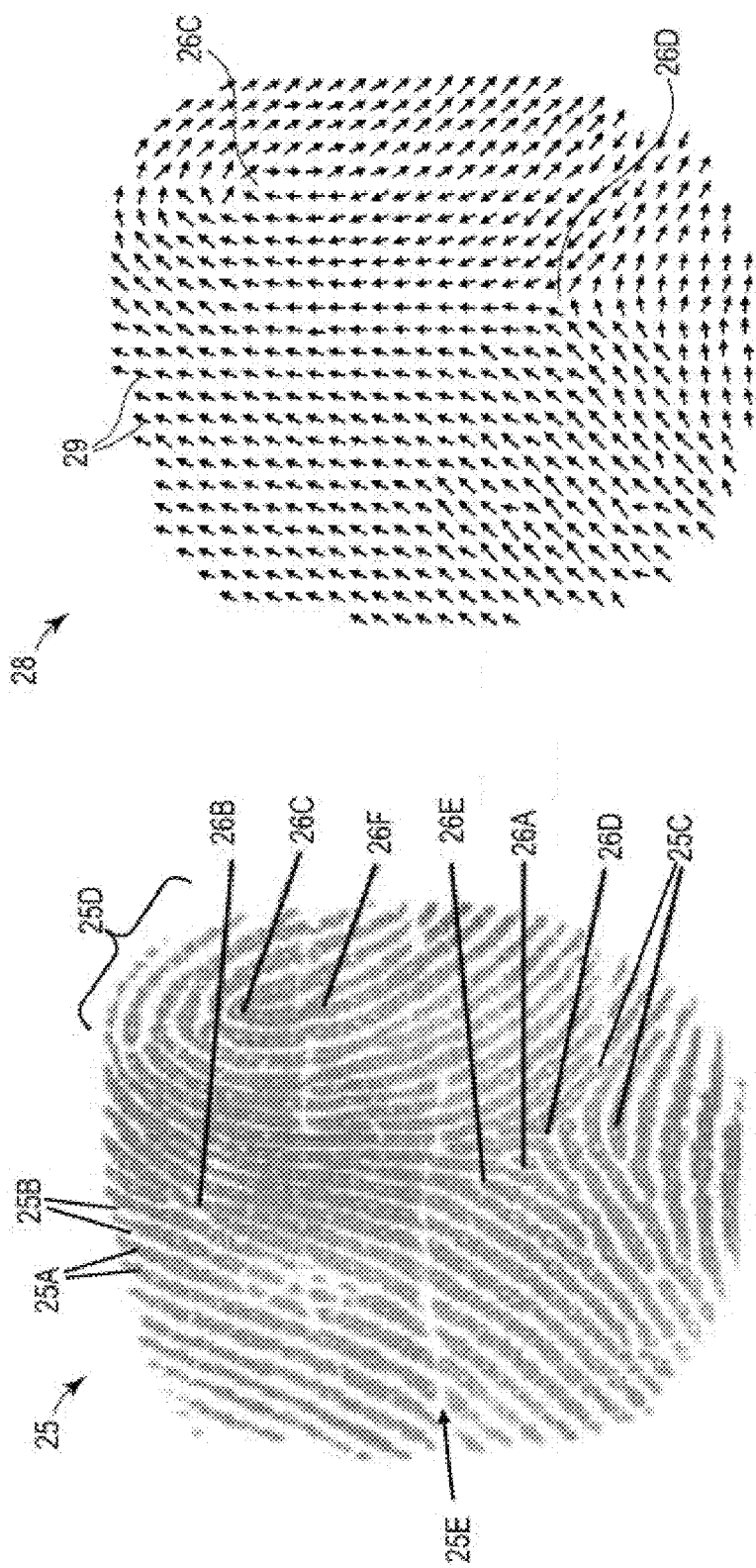

FINGERPRINT IMAGING AND QUALITY CHARACTERIZATION

TECHNICAL FIELD

The subject matter of this disclosure relates generally to fingerprint imaging, and specifically to fingerprint image processing for user identification and security applications. In particular, the disclosure relates to fingerprint image processing for securing digital electronics and electronic devices, including fingerprint quality analysis for user identification, user discrimination, and user authentication.

BACKGROUND

Fingerprint imaging is an important technique for securing access to electronic devices, including data transmission and communications applications where data security and user privacy are of paramount concern. In existing user identification and authorization systems, however, processing time and discrimination capability are critical factors, particularly where the imaging device and fingerprint samples may be exposed to moisture, oil, dirt, and other environmental factors, and where only partial sampling may be practical.

As a result, there is a continual need for advanced fingerprint imaging techniques, which are not subject to all the limitations of the prior art. In particular, there is a need for fingerprint imaging techniques that provide quick and accurate user identification and discrimination, in a system suitable for use on a broad range of business and consumer electronics, including, but not limited to, mobile phones, smartphones, personal digital assistants, personal computers, tablet computers, and other personal and business-oriented communications, digital processing, and computing applications.

SUMMARY

This disclosure relates to fingerprint imaging for user identification and authorization. In various examples and embodiments, a fingerprint imaging system includes a fingerprint sensor configured to generate a sensor image of a fingerprint, and a processor configured to process the sensor image. The processor is operable to generate a ridge flow map based on the sensor image, including a set of ridge flow vectors characterizing the fingerprint pattern.

The processor can also generate a multi-layer decomposition of the ridge flow map, with first-order residuals based on adjacent ridge flow vector values, and second-order residuals based on sets of adjacent first-order values. The quality of the fingerprint image can be characterized based on the residuals.

Depending upon application, the first-order residuals may be based on a difference between the respective ridge flow vector values, as compared to an average value of the first-order set of adjacent ridge flow vectors. The second-order residuals may be based on a difference between the respective average values of the first-order set, as compared to an average value of the second-order set.

The processor may be configured to characterize the quality of the fingerprint based on a measure of variance of one or both of the first and second order residuals. For example, the multi-layer decomposition may include at least one higher-order residual map of order N>2, based on a lower-order residual map of order N−1, and the processor may operate to characterize the fingerprint quality based on the measure of variance being below a threshold for the lower-order residual map, and above the threshold for the higher-order residual map.

In additional applications and examples, an electronic device may include the fingerprint imaging system, for example in combination with a display window, and the fingerprint sensor may be included within a control mechanism of the electronic device. In one particular type of device, the control mechanism may include a control button disposed within a cover glass.

Methods of using such a system include acquiring a fingerprint image, generating an orientation map based on the fingerprint image, and generating a multi-layer decomposition of the orientation map. The orientation map may include a set of vector values characterizing a ridge flow pattern of the fingerprint image, and the decomposition may include (at least) first and second order residuals of the vector values. For example, the first order residuals may be based on the orientation map, and the second order residuals may be based on a first-order transformation of the orientation map.

The quality of the fingerprint image can be characterized based on the residuals, or using a measure of the residual variance. Depending on application, the fingerprint image may be vetoed, based on the image quality or measure of variance.

The multi-layer decomposition can include one or more additional higher-order residuals of order N>2, based on lower-order residuals of order N−1. The quality of the fingerprint image can be characterized by passing the image for user identification, based at least in part on the measure of variance, as applied to the higher and lower order residuals. A user can also be authenticated for access (e.g., to an electronic device), based at least in part on the measure of variance.

In some applications, the fingerprint image can be compressed, based one or both of the first and second order residuals. The user can then be identified based on the compression of the image, for example without using the original orientation map.

The multi-layer residual decomposition may be generated by determining the first order residuals based on comparison to an average of adjacent vector values, as defined in the orientation map. Alternatively, the residual decomposition can be generated via a wavelet transformation of the orientation map, and the fingerprint image quality can be characterized by determining the measure of variance based on the residuals of the wavelet transformation.

In mobile device implementations, a fingerprint sensor can be integrated into a control mechanism, and configured for capturing a fingerprint image of a user in operation of the mobile device. The control mechanism may include a control button disposed in a cover glass of the device, with the fingerprint sensor configured for capturing the fingerprint image of the user in operation of the control button.

A processor can be provided in signal communication with the fingerprint sensor, operable to generate a ridge flow map comprising a set of ridge flow vectors characterizing the fingerprint image. The processor may also be operable to decompose the ridge flow map into a multi-layer residual mapping, and characterize an image quality of the fingerprint image, based on the residual mapping.

Depending on desired functionality, the residual mapping may include at least first and second order residuals based on the ridge flow vectors, and the image quality may be characterized based on a measure of variance of the residuals. The device can also be configured for identification and authorization of the user, based at least in part on the image quality. For example, the processor may be configured to characterize the image quality based on a measure of variance being below a selected threshold for at least one lower-order residual (e.g., of order N≤2), and above the selected threshold for at least one higher-order residual (e.g., of order N>2. In additional examples, the device can be configured for user identification and authorization based on the residuals and a corresponding measure of variance, absent the ridge flow map, or without explicit reference to either the ridge flow map or the original image, which may be erased or deleted in order to save space, and improve processing time.

BRIEF DESCRIPTION OF THE DRAWINGS

FIG. 2A is an illustration of an exemplary fingerprint image for processing by the system.

FIG. 2B is a ridge flow map of the exemplary fingerprint image.

FIG. 3A is a representative first-order or first-layer residual decomposition of the ridge flow map.

FIG. 3B is a representative second-order or second-layer residual decomposition of the ridge flow map.

FIG. 3C is a representative series of higher-order residual decompositions of the ridge flow map.

DETAILED DESCRIPTION

Figure 1:
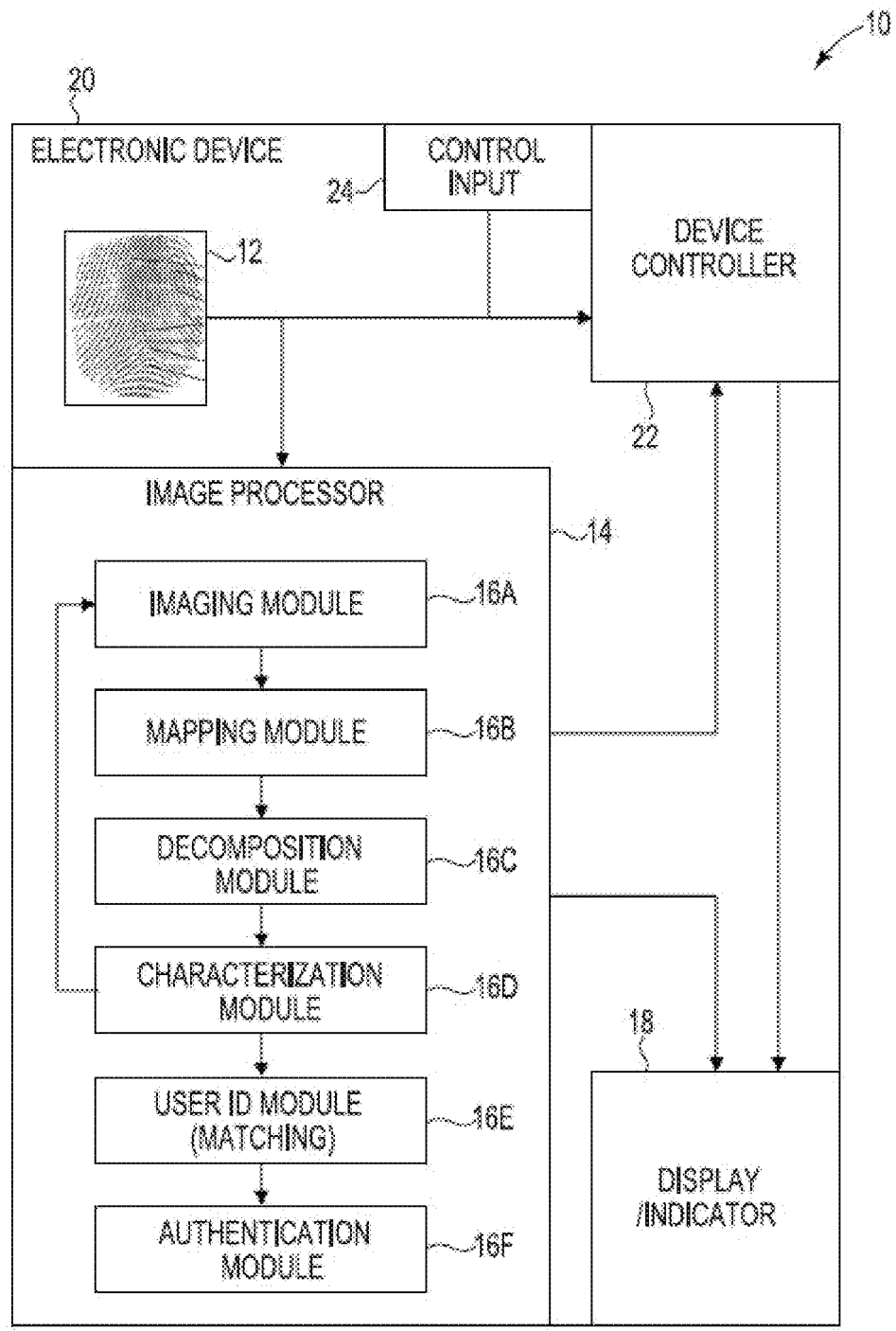
FIG. 1 is a block diagram of an exemplary fingerprint image processing system.

FIG. 1 is a block diagram of an exemplary fingerprint image processing system 10. In this particular configuration, fingerprint processing system 10 includes fingerprint image sensor 12 and processor 14. Processor 14 may include one or more hardware, firmware, and software modules, including, but not limited to, imaging module 16A, mapping module 16B, decomposition module 16C, characterization module 16D, user identification (or fingerprint matching) module 16E, and user authentication module 16F.

Depending on application, fingerprint processing system 10 may also include a display or indicator 18, such as an LED (light emitting diode) indicator or digital (e.g., touchscreen) display. Display 18 provides feedback from image processor 14, for example output from image characterization and user identification and authentication modules 16D-16F. System 10 with fingerprint (or image) sensor 12, processor 14 and display 18 may also be incorporated into a discrete electronic device 20 with device controller 22, for example a mobile phone or smartphone, media player, digital assistant, navigational device, tablet computer, personal computer, computer display, or other personal digital device or consumer electronics system.

In discrete device applications, controller 22 may provide for user identification and authorization utilizing fingerprint processing system 10. Device controller 22 is connected in signal communication with fingerprint sensor 12, image processor 14 and display 18, and may be provided with a combination of firmware and software to perform additional functions including, but not limited to, voice communications, messaging, media playback and development, gaming, internet access, navigational services, and personal digital assistant functions including reminders, alarms, and calendar tasks.

Fingerprint image sensor 12 comprises a scanner, camera or other imaging device suitable for fingerprint imaging, for example an optical or capacitive fingerprint sensor. Depending upon application, sensor 12 may be provided as a dedicated sensor apparatus, or incorporated into another component such as a touch screen display 18 or control input mechanism 24, for example a home or menu button.

Image processor 14 comprises memory and processing hardware configured to capture and process fingerprint image data from sensor 12. In particular, image processor 14 may include a number of software (or software and firmware) modules executable to perform particular image capture and image processing functions, for example one or more of imaging module 16A for converting sensor data from fingerprint sensor 12 into a fingerprint image, and mapping, decomposition, and characterization modules 16B-16D for processing and characterizing the image, as described below.

Depending upon application, image processor may also include user ID and authentication modules 16E and 16F for user identification and authentication (or authorization), based on the processed fingerprint image. Alternatively, one or more processing modules such as user ID and authentication modules 16E and 16F (or any of modules 16A-16D) may be provided within device controller 22, or in another data processing or control element of fingerprint image processing system 10 or electronic device 20.

FIG. 2A is an illustration of an exemplary fingerprint image 25 for processing by the system. Depending on user characteristics, fingerprint image 25 typically includes a number of friction ridges 25A (positive features) interspersed by valleys 25B (negative features), with pores 25C distributed or spaced along ridges 25A.

Generally speaking, fingerprints can be characterized by level one features including the overall pattern of ridges 25A, for example a radial or ulnar loop pattern 25D (or a pocket loop), an arch pattern (e.g., plain or tented), or a whorl (e.g., plain whorl, double whorl, or accidental whorl). Level two classifications include minutia and other features such as short ridge, independent ridge, and island features 26A, crossovers and bridges 26B, cores 26C, deltas 26D, ridge endings 26E, and ridge enclosures, spurs and bifurcations 26F. Level three details may include pores 25C, as well as additional attributes such as width, contour, deviation, and creases in the pattern of fingerprint ridges 25A, including, e.g., scars and breaks 25E.

FIG. 2B is a ridge flow map for exemplary fingerprint image 25 of FIG. 2A. Ridge flow map 28 is a form of orientation mapping, describing the spatial orientation or flow of friction ridges 25A, from which fingerprint image 25 is formed. For example, fingerprint image 25 may be divided into a number of (e.g., square or rectangular) blocks or pixels, with individual ridge flow vectors 29 to indicate the dominate or average orientation in each pixel, or other subdivision of the fingerprint pattern.

Depending upon application and convention, ridge flow vectors 29 may be restricted to a particular angular range, for example 0-180° (e.g., along the horizontal) or ±90° (e.g., from vertical). A variety of different conventions are available, reflecting the generality of any particular choice of direction along ridge lines 25A. Ridge flow vectors 29 may also be represented with or without directional arrows; that is, providing the angular orientation of the ridge lines only, without selecting a particular sign or direction along the ridge lines.

To improve fingerprint image processing, including user identification and authentication, additional statistical tools can be developed to characterize the quality and uniqueness of different fingerprint images 25 and ridge flow maps (or mappings) 28. In particular, a wavelet or other hierarchical decomposition of ridge flow map 28 may be performed, for example utilizing a Haar transform, or by averaging ridge flow vectors 29 over a plurality of (e.g., adjacent) pixels. As a result, a pyramidal or hierarchal image analysis can be developed, based on increasingly higher-order (and typically lower resolution) mappings.

Residuals can be computed at each of the mapping levels or orders, based on the difference between the "real" or actual values of vectors 29, and the average (multi-pixel) values, or other decomposition function. Alternatively, a predictive coding scheme can be utilized, where the residuals are based on a difference between the vector values and a predicted value, based on a set or grouping of adjacent (e.g., nearest neighbor) vector values. At higher orders, for example N≥2 or N>2, the residuals can be based on comparison to the corresponding sets of vectors or decomposition values in the next-lower order (that is, the N−1 order groupings).

Wavelet-based transformations and residual determinations are also contemplated, for example using a Haar basis or other wavelet basis to transform the vector values of the ridge flow mapping (or ridge flow field). In wavelet-based approaches, higher-order residuals of order N≥2 or N>2 are again based on the next-lower order (N−1) sets or groups of adjacent values. The result is a multi-layer hierarchical (or pyramidal) decomposition of the fingerprint image, as described above, with the first order based on the ridge flow map and corresponding vector values, and the higher orders based on the successive decompositions, in sequential order.

A measure of variance can also be computed for each of the residual distributions, at each layer of the hierarchy. Collectively, a signature based on different variances obtained from among the different mapping layers can then be obtained, and the variance signature (or other measure of statistical variance or qualitative variation) can be used to describe overall image quality.

Figures 3A, 3B, 3C:
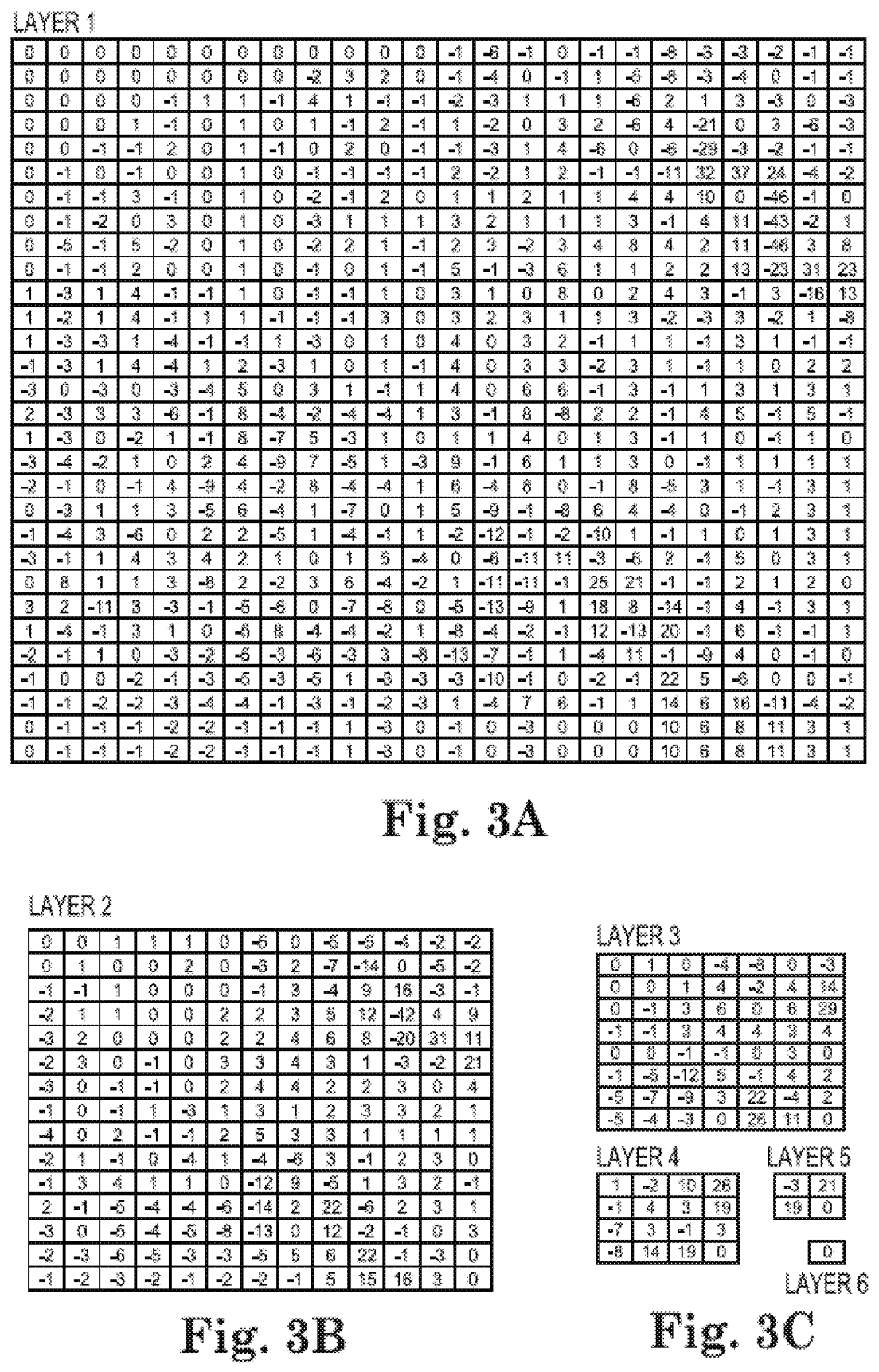

FIG. 3A is a representative first-order (or first layer) residual decomposition or encoding for ridge flow map 28, as shown in FIG. 2B. In this particular example, ridge flow map 28 is pixelated into square or rectangular plot regions or sectors, and groups of (e.g., four or nine) adjacent pixels are averaged. The residuals are calculated based on the difference between individual ridge flow vector values 29, and the average value corresponding to the set of adjacent pixels.

FIG. 3B is a representative second-order (second layer) residual decomposition or encoding for ridge flow map 28, based on the pixel grouping of FIG. 3A. FIG. 3C is a representative series of higher-order residual decompositions, in a hierarchical distribution based on the first and second-order pixel groupings of FIGS. 3A and 3B.

As seen from comparing fingerprint image 25 of FIG. 2A to ridge flow map 28 of FIG. 2B, calculating average and residual values may be complicated where ridge lines 25A converge, diverge, and run in different directions, for example in the presence of pattern features and minutiae such as core 26C and delta 26D, and along the border regions of ridge flow map 28. In particular, adjacent ridge flow vectors 29 may have substantially non-continuous values in these regions, or they may not be well defined, and different conventions may be utilized to define the corresponding average and residual values.

For example, individual ridge lines 25A may be mapped continuously across fingerprint image (or pattern) 25, as shown in ridge flow map 28 of FIG. 2B. Alternatively, the values of ridge flow vectors 29 (or differences between vector values 29) may be constrained, for example within a range of 0-180° or ±90°, as described above. The average and residual values also depend upon the systems of coordinates and units in which the vector values are defined, and the results may be normalized, or arbitrarily scaled.

Thus, the residual mapping representations of FIGS. 3A-3C are merely representative, and not limited to any particular fingerprint pattern, nor any particular system of units or coordinates. The decompositions are also not limited to any particular transformation basis, or other convention. Different pixelation patterns may also be employed, for example with a rectangular, triangular, or hexagonal tessellation, or based on overlapping pixel groups, or using a Gaussian weighting, wavelet transformation, or other function to generate each higher-order decomposition mapping (e.g., N≥2 or N>2), from the corresponding sets of next-lower-order (N−1) groupings.

Other forms of decomposition functions include discrete and orthonormal (or orthogonal) wavelet transformations, including the Haar basis and other transformation functions, and different combinations of up-sampling and down-sampling techniques. Noise reduction functions and filtering may also be utilized, for example including a triangular algorithm or other weighting function to reduce noise contributions in the lower-order decomposition layers, as compared to the higher-order layers in which noise contributions may be reduced, and more global pattern features may be indicated. Ridge flow map 28 of FIG. 2B and the decompositions of FIGS. 3A-3C can also be subject to arbitrary rotations, skews, flattening, reflections, and other coordinate transformations, in order to account for distortion in the original fingerprint image 25, and to provide rotational, translational, and other geometrical invariance(s) in the corresponding fingerprint characterization and matching analysis.

Based on the selected decomposition techniques, the residual maps of FIGS. 3A-3C may provide substantial discriminatory power. For example, relatively high variance in the lower-order mapping layers (or residuals) may indicate a corrupt or low quality image, while greater variance in the higher-order layers may indicate overall curvature, or another larger-scale ridge pattern structure. Relatively lower variance in the higher layer residuals, in contrast, may indicate a substantially parallel line structure, as described below, with less overall curvature or pattern definition.

Figure 4A:
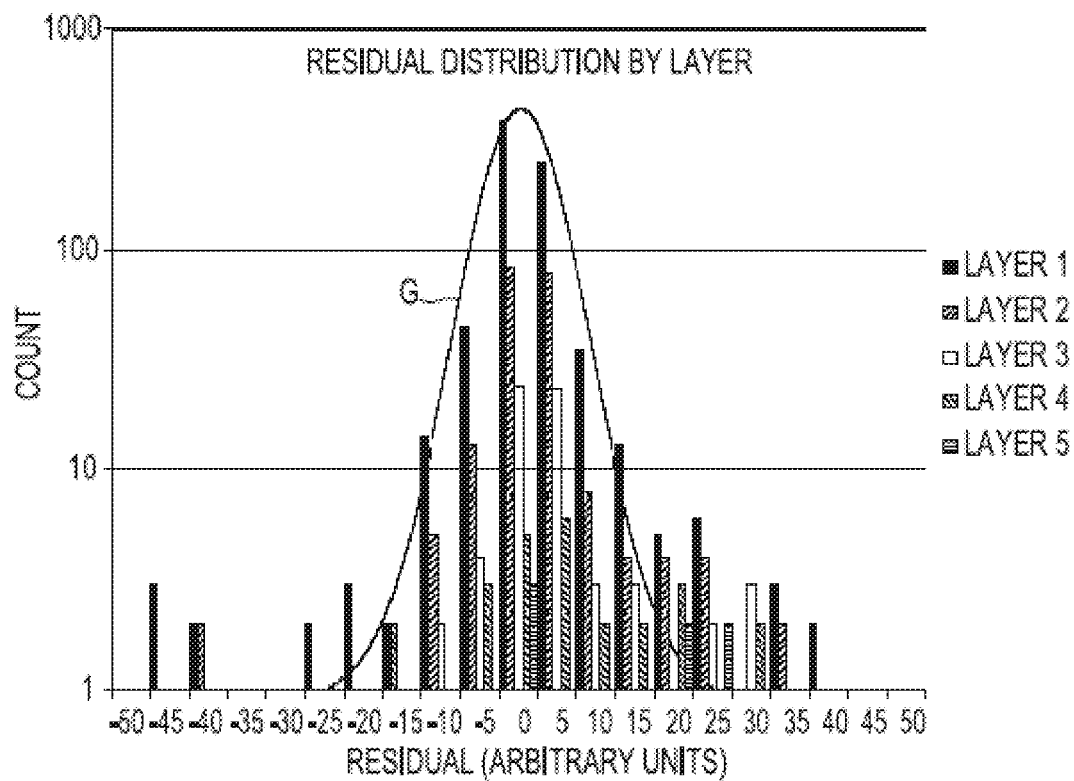
FIG. 4A is a plot of exemplary residual distributions for the different layers of the ridge flow map decomposition.

FIG. 4A is a plot of exemplary residual distributions, as determined for the different layers of the ridge flow map decomposition in FIGS. 3A-3C. In this particular example, residual distributions are plotted for each individual order (or layer) in the decomposition, with residual values in arbitrary units along the horizontal axis, and the number of counts (pixels or sets of pixels) on the vertical.

As shown in FIG. 4A, the residuals are distributed generally about zero, as expected for random sampling. The distribution is not necessarily Gaussian, however, as shown by the comparison curve (G), centered on the distribution for the first-order residuals (layer 1). In particular, the residual distribution has relatively large tails at high residual values, indicating non-random structure in the corresponding ridge flow pattern. The higher-value residuals may also be skewed toward either positive or negative values, as indicative of an overall direction of curvature (or lack thereof), and as determined by other global features of the ridge flow mapping and underlying fingerprint pattern.

Figure 4B:
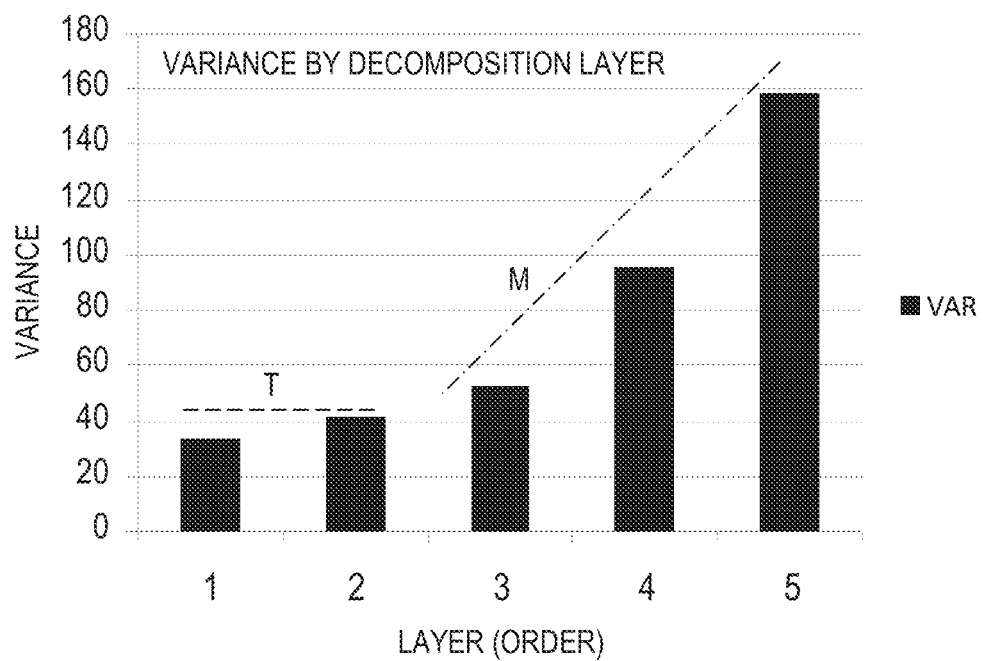
FIG. 4B is a plot of a variance signature for the residual decomposition layers, in a relatively low noise, high curvature example.

FIG. 4B is a representative variance signature for the decomposition layers in FIG. 4A. As shown in FIG. 4B, the variance for this particular sample tends to increase with layer or decomposition order, particularly in the third, fourth and fifth layers (or orders). This may indicate relatively good quality image, as described above, with relatively low noise and a substantial overall curvature or other (e.g., non-parallel) pattern structure. In addition, the variances are relatively small for the lower-order decompositions, particularly in the first and second orders, which may also indicate that a relatively high quality image was obtained, with relatively low noise (or noise ratio).

These statistical tools and techniques may be utilized in image processing, based on the indicated fingerprint image quality. Where the image quality is determined to be relatively low, for example, another image or fingerprint scan may be required, before expending additional computational resources on matching and other analysis. In particular, reimaging may be required when the low-order variance (or other statistical measure) exceeds a particular threshold T, for example a threshold of about 50 (or other arbitrarily scaled value) for lower-order layers 1 and 2 (or 3) of the decomposition mapping, or where the variance analysis otherwise indicates that matching may be difficult or unsuccessful, due to poor image quality.

Where the image quality is indicated to be good, however, processing may proceed with a higher confidence or likelihood of a correct match (or rejection), as appropriate based on the desired user authentication profile. For example, good image quality may be indicated by a variance above the selected threshold T for one or more higher-order residual layers (or orders), for example N>2 (e.g., N=3, 4, or 5), or by a particular (e.g., positive) slope M, as defined between one or more lower-order layers N≤2, and one or more higher-order layers N>2.

Although FIG. 4B is presented in terms of variance, other measures of the sample variation are also contemplated. For example, the standard deviation may be used, or another quantity that is a function or measure of variance, or another measure of the qualitative variation in the sample. Alternatively, a range-based measure of the variance or variation may be used, for example an inter-quartile range, or a full width at half maximum of the residual distribution. Thus, the variance is merely one example of a representative measure for use in the analysis, and other characterizations of the (statistical) variance and (qualitative) variation are also contemplated, with analogous adaptations in the corresponding image quality and fingerprint matching analysis.

These different variance and variation measures can also be utilized in histogram form, as shown in FIG. 4B, or using another distribution. Alternatively, the image quality and print matching analysis may utilize the numerical values of the variance itself (or other measure of sample variation), independently of any particular graphical form.

Figure 4C:
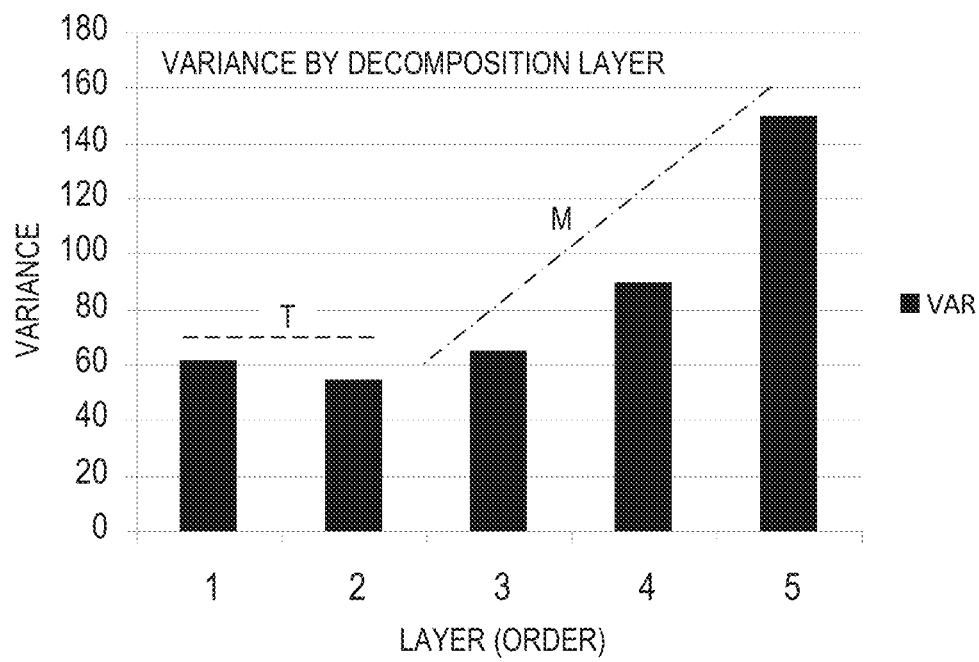
FIG. 4C is an alternate variance signature, for a decomposition with relatively higher noise content.

FIG. 4C is an alternate variance signature, for a residual distribution with relatively higher noise content. As compared to the relatively low noise, high curvature signature of FIG. 4B, in FIG. 4C the lower-level decomposition layers may have greater variance (or other measure of the sample variation), with a correspondingly lower slope M in the higher-order layers. Thus, threshold T and slope M may be defined or selected to have different values in different applications, depending upon the desired level of discrimination between different variance (or variation) signatures, and the corresponding veto and re-imaging rates.

Figure 4D:
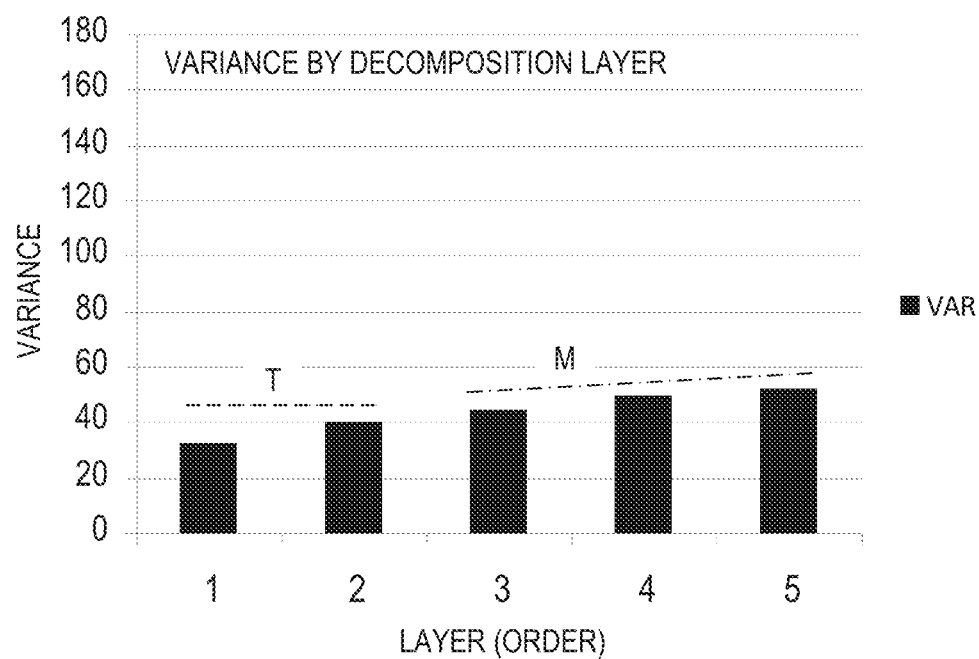
FIG. 4D is a variance signature for a decomposition with low noise and relatively low curvature.

FIG. 4D is a variance signature for a low noise, fairly low curvature residual distribution. In this example, the variance (or noise) is relatively small in the lower-order layers of the decomposition. In contrast to the relatively high-curvature cases of FIGS. 4B and 4C, however, the variance is somewhat less in the higher-order layers, corresponding to an even lower slope M.

Figure 4E:
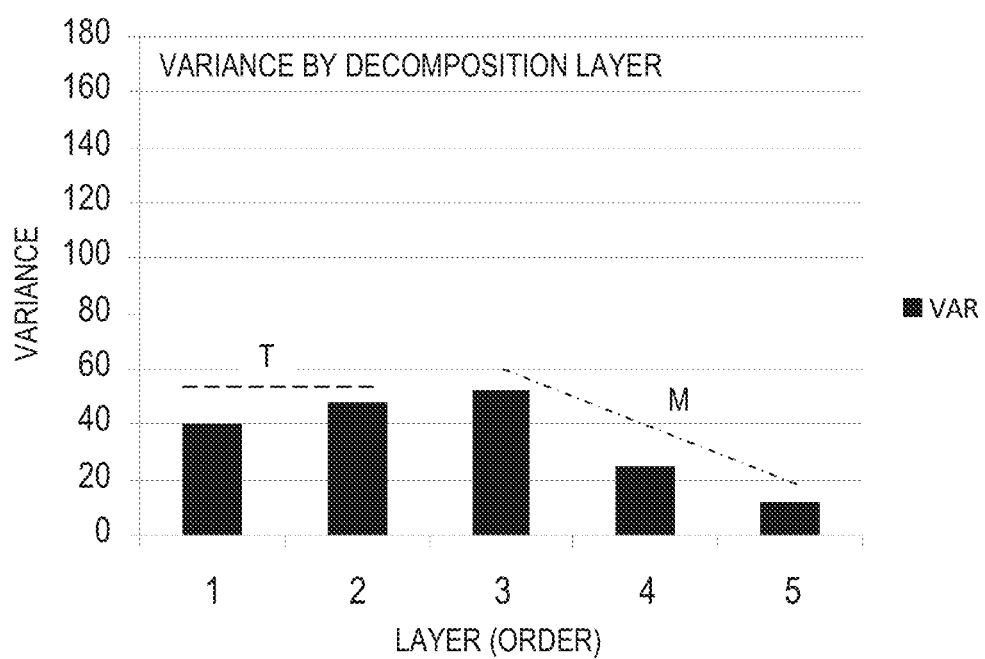
FIG. 4E is a variance signature for a decomposition with moderate noise and very low curvature.

For example, slope M may have a relatively low positive value, as compared to the higher curvature examples of FIGS. 4B-4C, or the measure of variance may plateau in the higher-order residuals, with a slope M of about zero, as shown in FIG. 4D. This may indicate that the underlying fingerprint image has lower pattern curvature (that is, less swirl, or other curvature-related characteristic). The curvature may also be small as compared to the noise signature, so that the distribution drops off, as shown in the relatively higher or moderate noise, very low curvature (or substantially zero curvature) residual distribution of FIG. 4E. In this particular example, slope M may have a negative value; that is, with a downslope value for M, where the variance signature approaches zero in the top layers of the residual distribution (e.g., orders N≥5).

The variance signatures can also be converted to measures of entropy or randomness in fingerprint image 25 and ridge flow map 28. The entropy measures, in turn, can be fed into one or more matching algorithms or modules, in order to consider entropy among the different characteristics of the image used for user identification and authentication, along with other features such as curvature and minutiae.

The entropy of a given image, ridge flow map, or residual layer can defined by the residual distributions or histograms. For example, a logarithmic measure of the variance may be used, such as:

$$S = \ln[\sigma\sqrt{(2\pi e)}]. \qquad [1]$$

In this particular example, S is the entropy, e is the base of the natural logarithm, and σ is the square root of the variance ($\sigma^2$); that is, the standard error (for example, the root mean square deviation, or standard deviation). Alternatively, the standard deviation (σ) or variance ($\sigma^2$) may be used as a direct measure of the entropy, or another statistical measure may be used, either based on the variance itself, or scaled by a function of the variance (or standard deviation).

In additional applications, residual encodings of the lower layers in the mapping hierarchy can be used to compress fingerprint image 25. For instance, one or more lower layers of the hierarchy could be dropped to achieve compression, noise removal, or both. Alternatively, one or more lowest significant bits could be dropped, for example bits that are below the noise floor for a particular residual layer.

For example, one or more lower-significance bits may be dropped when the bits are more likely to contain system noise, and may therefore be omitted from the representation without substantial loss of discrimination. In one particular application, one, two, or three lower-order bits may be dropped from a first (or zeroth-order) layer, depending on noise level. Similarly, one or two lower-order bits may be dropped from a second (or first-order) layer, and zero or one lower-order bits may be dropped from a third (or second-order) layer.

Ridge flow map 28 can also be rotated or translated to provide orientation and translation-invariant matching tools. Similarly, the residual mappings can also be rotated or re-centered, in order to provide corresponding rotational and/or translational invariance in the residual layer analysis. More generally, at higher orders the effects of rotation and translation may also be less, so that the effect of any global orientation shift is reduced or removed, for example in the top (single-valued) layers, which may be defined as a substantially scalar (or pseudo-scalar) quantity, invariant with respect to rotation and translation. Depending upon definition, the residual analysis may also be invariant with respect to parity or other reflective transformation, for example as generated by different image sensors or image capturing devices.

The variance signatures (and other variation measures) can also be defined with rotational and/or translational invariance, and other symmetry properties as described above. In addition, the overall variance signatures and individual variance measures can also be fed into or utilized in a neural network, learning vector machine, or statistical classifier (or classification) algorithm, which can be trained or programmed to recognize, describe, characterize, and match different fingerprint images 25 and ridge flow maps 28, with or without explicit reference to rotational angle, translational position, or other coordinate transform.

Figure 5A:
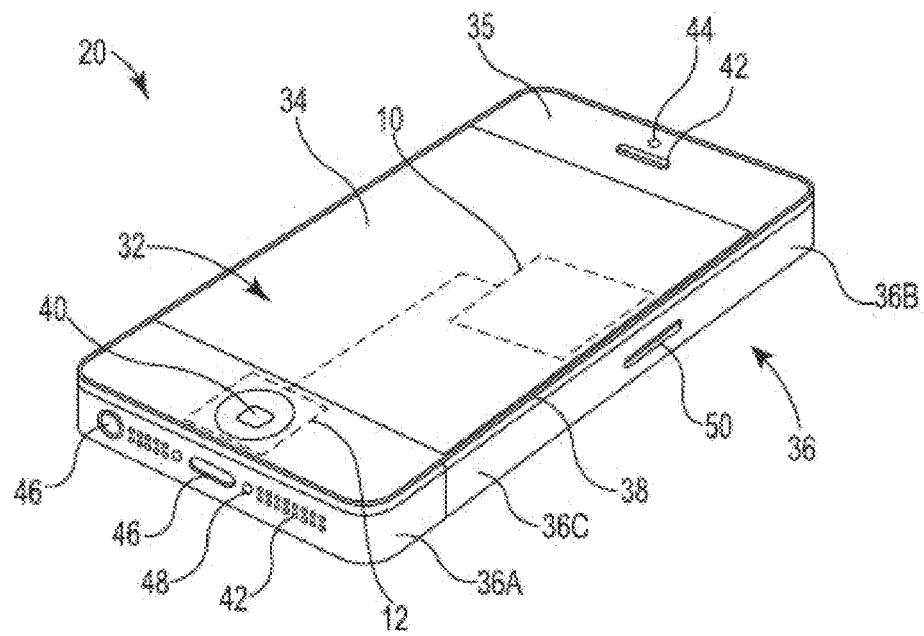
FIG. 5A is a perspective view of an exemplary electronic device utilizing the fingerprint imaging system.

FIG. 5A is a perspective view of an exemplary electronic device 20 utilizing fingerprint processing system 10. In this particular configuration, device 20 can be configured for use in a mobile device application, for example a mobile phone or smartphone. Alternatively, device 20 may be configured as a media player, digital assistant, tablet computer, personal computer, computer display, or other electronic device, in either portable or stationary form.

As shown in FIG. 5A, device 20 includes front cover glass 32 with display window 34 for a touch screen or other display component, as defined between border or frame regions 35. Cover glass 32 is coupled to housing assembly 36, for example utilizing a bezel or frame structure 38 in combination with one or more bottom, top, and side housing sections 36A, 36B, and 36C.

Cover glass 32 is typically formed of a glass or other durable transparent material, for example silica glass, or a clear plastic polymer such as acrylic or polycarbonate. Transparent ceramics can also be used, such as aluminum oxide or single-crystal sapphire materials. Housing 36 and frame 38, in turn, may be formed of metals such as aluminum and steel, or from plastic, glass, ceramics, and composite materials, or combinations thereof.

Fingerprint processing system 10 can be provided within a particular electronic device 20, as shown in FIG. 5A, for example with fingerprint sensor 12 incorporated into a home button or other control mechanism 40, as provided in cover glass 32 (or within control input mechanism 24, see FIG. 1). In these configurations, fingerprint imaging and user authentication may be provided automatically whenever control device or mechanism 40 (or 24) is operated. Alternatively, authentication may be required at device startup, or at periodic intervals, for example by placing a finger on control mechanism 40 (or 24), or utilizing another, standalone fingerprint sensor 12.

Depending on configuration, cover glass 32 and housing 36 may also accommodate other control and accessory features, including, but not limited to, additional menu and hold buttons, volume controls, and other control mechanisms 40, along with various audio (e.g., speaker and microphone) features 42, sensors, lighting indicators (e.g., light emitting diodes or flash components), and camera features 44. Device 20 may also include connector apertures or ports 46 for power and data communications between device 20 and a host computer or peripheral device, with mechanical fasteners 48 and one or more access ports 50 for a subscriber identity module (SIM card), flash memory device, or other internal component.

Figure 5B:
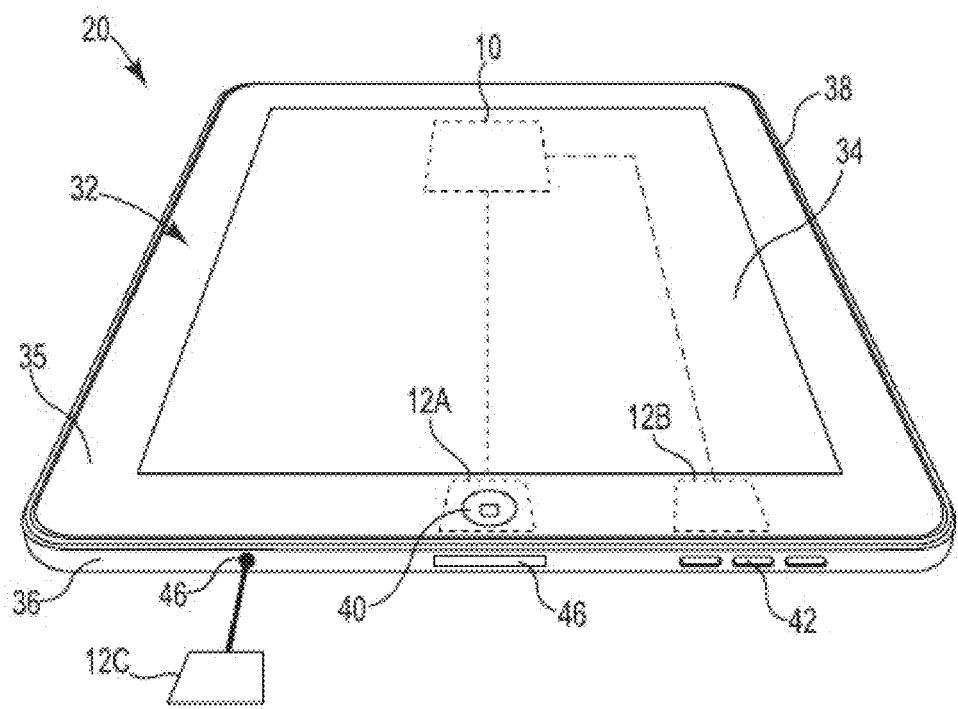
FIG. 5B is a perspective view of the electronic device, in an alternate configuration.

FIG. 5B is a perspective view of electronic device 20, in an alternate configuration, for example a tablet computer, media player, minicomputer, personal computer, computer display, or similar electronics component. In this configuration, housing assembly 36 may be provided in a substantially unitary form, in combination with the back cover of device 20. An internal frame 38 or bezel groove may be utilized for coupling housing 36 to cover glass 32, with display window 34.

As shown in FIG. 5B, device 20 may provide a fingerprint sensor 12A incorporated into a home button or other control mechanism 40, as described above. Alternatively, a standalone fingerprint sensor 12B may be provided, for example within frame region 35 of cover glass 32, or within housing assembly 36. Fingerprint sensor 12C may also be provided as an external accessory, for example coupled via a USB port or other connector aperture 46, or using a wireless connection for user authentication to device 20.

Figure 6:
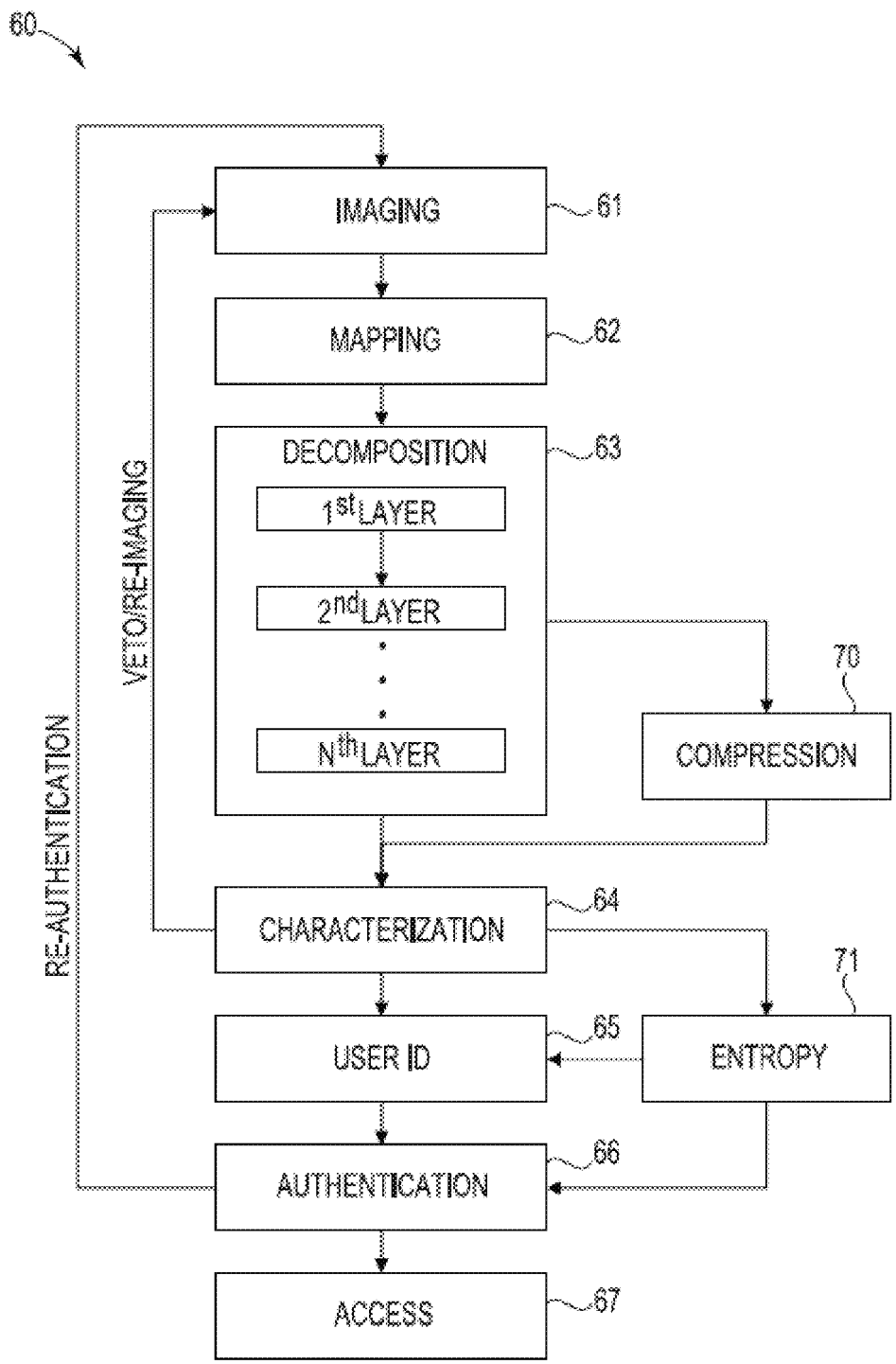
FIG. 6 is block diagram illustrating an exemplary method for using the fingerprint imaging system to characterize fingerprint image quality.

FIG. 6 is block diagram illustrating an exemplary method 60 for using fingerprint processing system 10, for example to characterize image quality and authenticate a user to an electronic device 20, as described above. As shown in FIG. 6, method 60 may include one or more steps of sensing a fingerprint image (step 61), mapping ridge flow lines in the fingerprint (step 62), and decomposing the ridge flow map into a number of residual layers of varying order (step 63).

Method 60 may also include characterizing the image quality (step 64), using the residual decomposition (step 63). Based on the image quality characterization, the image may be vetoed, for example in order to require re-imaging (step 61), or the image may be passed for additional processing, including user identification (step 65) and authentication (step 66). Depending on the outcome of user authentication (step 66), access to the device may be granted (step 67), or re-authentication may be required, for example by capturing a new fingerprint image (step 61).

In some applications, the (e.g., first or second order) residual mapping layer may be used to compress the image (step 70), for example by dropping lower-significance bits and/or utilizing (and storing) one or more residual mapping layers in place of the fingerprint image itself, or in place of the ridge flow map, or in place of both the fingerprint image and the ridge flow map. In addition, a measure of entropy may be generated (step 71) for use in user identification (step 65) or authentication (step 66), for example based on a logarithmic measure of the variance, as described above, or using the variance itself, or using a standard deviation or other measure that scales with the variance or variation of the sample, in either linear or nonlinear form.

The various image capture and processing steps of method 60 may be performed by fingerprint imaging and processing system 10 with fingerprint image sensor 12 (or 12A, 12B, or 12C), as described above. In particular, method steps 61-67 and 70-71 may be performed by a sensor 12 and processor 14 within such a system 10, utilizing one or more processor modules 16A-16F, as shown in FIG. 1, either alone or in combination with a controller 22 and additional processing elements of an electronic device 20, for example as shown in FIGS. 5A and 5B.

Figure 7A:
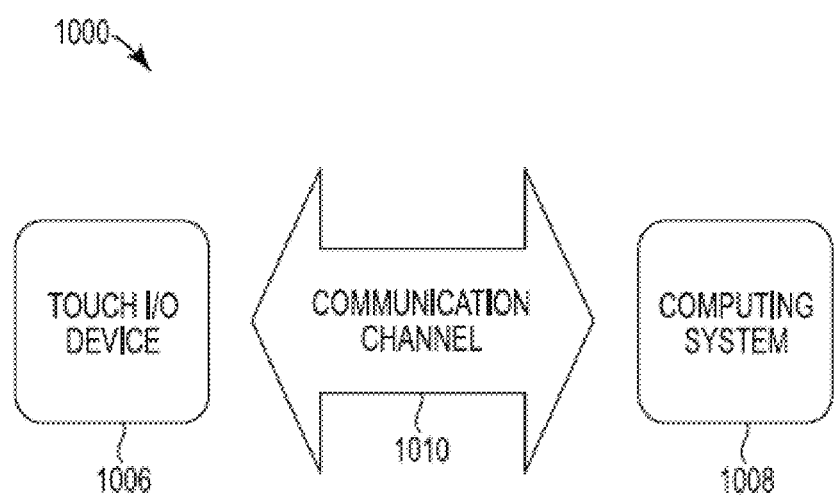
FIG. 7A is a conceptual drawing of an electronic device including a fingerprint recognition system.
Figure 7B:
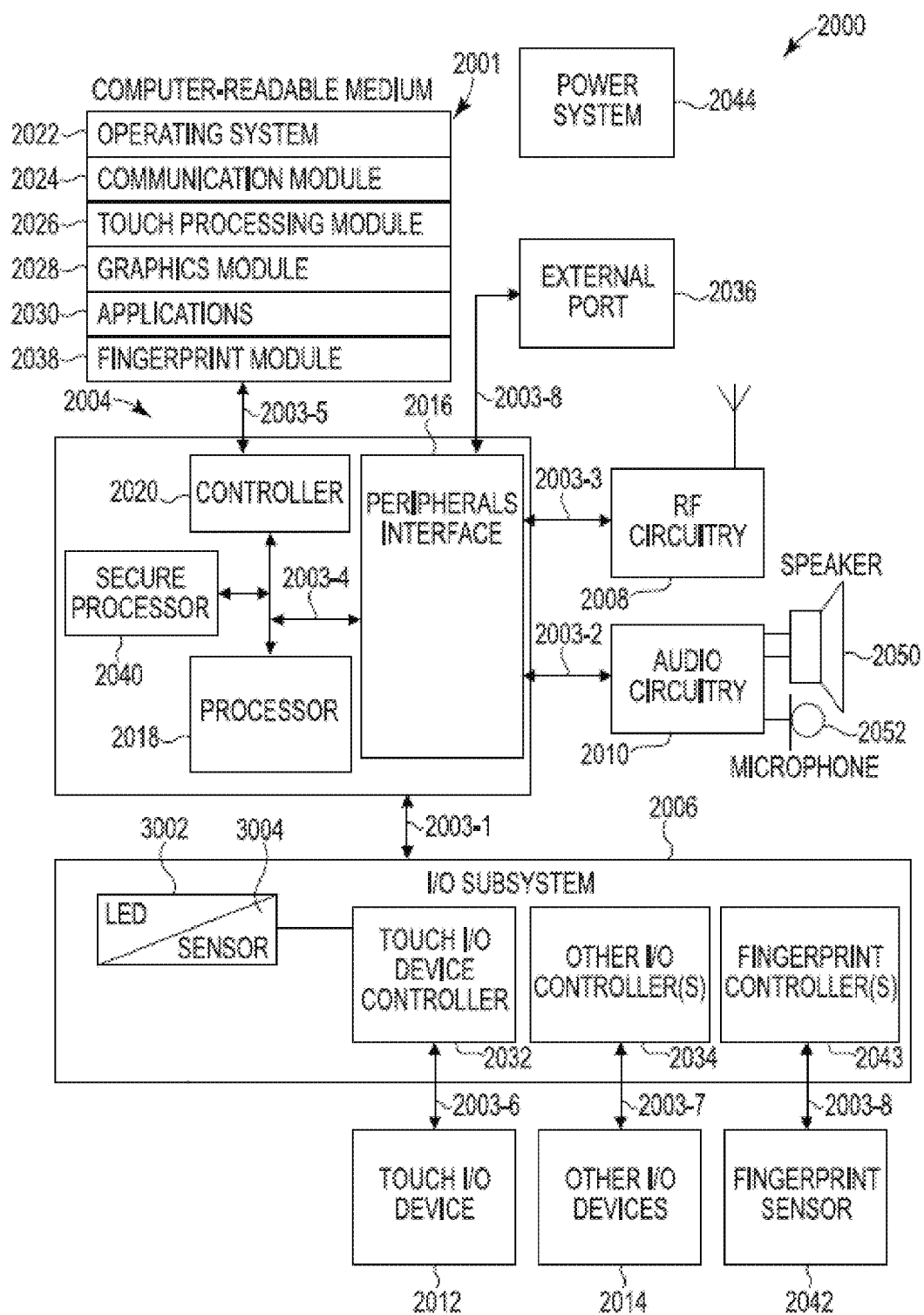
FIG. 7B is a block diagram illustrating the fingerprint recognition system.

FIG. 7A is a conceptual drawing of an electronic device or system 1000, for example with touch-sensitive input/output (touch I/O) device 1006 in communication with computing system 1008 via communications channel 1010. FIG. 7B is a block diagram illustrating fingerprint recognition system 2000 for use with such a device, or with another fingerprint processing system 10 or electronic device 20, as described above. Collectively, FIGS. 7A and 7B provide an exemplary conceptual illustration of an electronic device 20 or system 1000 including touch I/O device 1006 or other fingerprint sensor 12, and fingerprint recognition system 2000 or fingerprint processing system 10.

Described embodiments may include touch I/O device 1006 or 2012 that can receive touch input for interacting with computing system 1008 or processing system 2004 via wired or wireless communication channel(s) 1010 or 2003. Touch I/O device 1006 may be used to provide user input to computing system 1008 in lieu of or in combination with other input devices such as a keyboard, mouse, etc. One or more touch I/O devices 1006 or 2012 may also be used for providing user input to computing system 1008 or processing system 2004.

As represented in FIG. 7A, touch I/O device 1006 may be an integral part of computing system 1008 (e.g., touch screen on a laptop), or touch I/O device 1006 may be separate from computing system 1008. For example, touch I/O device 1006 can interact with a user with the user touching the touch I/O device 1006 with the user's finger (or otherwise bringing the user's finger near to the touch I/O device 1006), with the effect that the touch I/O device 1006 can receive fingerprint image data, and optionally provide feedback to the user that the fingerprint image data was received.

Touch I/O device 1006 may include a touch sensitive panel which is wholly or partially transparent, semitransparent, non-transparent, opaque or any combination thereof. Touch I/O device 1006 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1006 embodied as a touch screen may include a transparent and/or semitransparent touch sensitive panel partially or wholly positioned over at least a portion of a display. According to this embodiment, touch I/O device 1006 functions to display graphical data transmitted from computing system 1008 (and/or another source) and also functions to receive user input. In other embodiments, touch I/O device 1006 may be embodied as an integrated touch screen where touch sensitive components/devices are integral with display components/devices. In still other embodiments a touch screen may be used as a supplemental or additional display screen for displaying supplemental or the same graphical data as a primary display, and to receive touch input.

Touch I/O device 1006 may be configured to detect the location of one or more touches or near touches on touch I/O device 1006 based on capacitive, resistive, optical, acoustic, inductive, mechanical, chemical measurements, or any phenomena that can be measured with respect to the occurrences of the one or more touches or near touches in proximity to touch I/O device 1006. Software, hardware, firmware or any combination thereof may be used to process the measurements of the detected touches to identify and track one or more gestures or fingerprints. A gesture or fingerprint may correspond to stationary or non-stationary, single or multiple, touches or near touches on touch I/O device 1006. A gesture or fingerprint may be performed by moving one or more fingers or other objects in a particular manner on touch I/O device 1006 such as tapping, pressing, rocking, scrubbing, twisting, changing orientation, pressing with varying pressure and the like at essentially the same time, contiguously, or consecutively. A gesture or fingerprint may be characterized by, but is not limited to, a pinching, sliding, swiping, rotating, flexing, dragging, or tapping motion between or with any other finger or fingers. A single gesture may be performed with one or more hands, by one or more users, or any combination thereof.

Computing system 1008 may drive a display with graphical data to display a graphical user interface (GUI). The GUI may be configured to receive touch input via touch I/O device 1006. Embodied as a touch screen, touch I/O device 1006 may display the GUI. Alternatively, the GUI may be displayed on a display separate from touch I/O device 1006. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual user interface (UI), and the like. A user may perform gestures at one or more particular locations on touch I/O device 1006 which may be associated with the graphical elements of the GUI. In other embodiments, the user may perform gestures at one or more locations that are independent of the locations of graphical elements of the GUI. Gestures performed on touch I/O device 1006 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1008 (e.g., affect a state or mode of a GUI, application, or operating system). Gestures may or may not be performed on touch I/O device 1006 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1010 in response to or based on the touch or near touches on touch I/O device 1006. Feedback may be transmitted optically, mechanically, electrically, olfactory, acoustically, or the like or any combination thereof and in a variable or non-variable manner. For example, feedback can include interaction with a user indicating (A) that one or more sets of fingerprint image information have been received, (B) that one or more sets of fingerprint image information have been enrolled in a database, (C) that one or more sets of fingerprint image information have been confirmed as associated with the user, or otherwise.

Attention is now directed towards embodiments of a system architecture that may be embodied within any portable or non-portable device including but not limited to a communication device (e.g. mobile phone, smartphone), a multi-media device (e.g., MP3 player, TV, radio), a portable or handheld computer (e.g., tablet, netbook, laptop), a desktop computer, an all-in-one desktop, a peripheral device, or any other system or device adaptable to the inclusion of system architecture 2000, including combinations of two or more of these types of devices. A block diagram of one embodiment of system 2000 generally includes one or more computer-readable media 2001, processing system 2004, Input/Output (I/O) subsystem 2006 and 2007, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in the figure is only one example architecture of system 2000, and that system 2000 could have more or fewer components than shown, or a different configuration of components. The various components shown in the figure can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various components for establishing and maintaining communication between peripherals and processing system 2004. Audio circuitry 2010 is coupled to audio speaker 2050 and microphone 2052 and includes circuitry for processing voice signals received from interface 2016 to enable a user to communicate in real-time with other users. In some embodiments, audio circuitry 2010 includes a headphone jack.

Peripherals interface 2016 couples the input and output peripherals of the system to processor 2018 and computer-readable medium 2001. One or more processors 2018 communicate with one or more computer-readable media 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or sets of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components. Communication module 2024 facilitates communication with other devices over one or more external ports 2036 or via RF circuitry 2008 and includes various software components for handling data received from RF circuitry 2008 and/or external port(s) 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc. Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with figures as shown herein. Fingerprint sensing module 2038 may at least function to perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detect and track touches or near touches (and any movement or release of a touch) on touch I/O device 2012, and convert the detected touch input into interaction with graphical objects, such as one or more user-interface objects. In the case in which touch I/O device 2012 is embodied as a touch screen, the user can directly interact with graphical objects that are displayed on the touch screen. Alternatively, in the case in which touch I/O device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. In embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), via olfactory feedback, acoustically (e.g., a beep or the like), or in any combination thereof, and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices. In some embodiments, peripherals interface 2016, one or more processors 2018, and memory controller 2020 may be implemented on a single chip, such as processing system 2004. In some other embodiments, they may be implemented on separate chips. In addition to the foregoing, the system 2000 may include a secure processor 2040 in communication with a fingerprint sensor 2042, via a fingerprint I/O controller 2043. The operation of these various elements will now be described.

The fingerprint sensor 2042 may operate to capacitively capture a series of images, or nodes. When taken together, these nodes may form a set of fingerprint image information. A collection of nodes may be referred to herein as a "mesh," "mosaic," "template," or other indicator of fingerprint information. Each node of fingerprint information may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the fingerprint information.

Sensed fingerprint data may be transmitted through the fingerprint I/O controller 2043 to the processor 2018 and/or the secure processor 2040. In some embodiments, data are relayed from the fingerprint I/O controller 2043 to the secure processor 2040 directly. Generally, the fingerprint data are encrypted by any of the fingerprint sensor 2042, the fingerprint I/O controller 2043 or another element prior to being transmitted to either processor. The secure processor 2040 may decrypt the data to reconstruct the node.

Fingerprint data, either as individual nodes, collections of nodes, or substantially complete fingerprint templates, may be stored in the computer-readable medium 2001 and accessed as necessary. In some embodiments, only the secure processor 2040 may access stored fingerprint data, while in other embodiments either the secure processor or the processor 2018 may access such data.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

We claim:

1. A fingerprint imaging system comprising:
   a fingerprint sensor configured to generate a fingerprint image of a fingerprint; and
   a processor configured to process the fingerprint image, the processor operable to:
   generate a ridge flow map based on, at least in part, the fingerprint image, the ridge flow map comprising ridge flow vectors characterizing the fingerprint;
   generate a multi-layer decomposition of the ridge flow map based on, at least in part, the ridge flow vectors, the decomposition comprising:
   a first-order residual map comprising first-order residuals for the ridge flow vectors, based on, at least in part, a first-order set of adjacent ridge flow vector values; and
   a second-order residual map comprising second-order residuals for the ridge flow vectors, based on, at least in part, a second-order set of the adjacent first-order values;
   wherein:
   the processor is further operable to characterize a quality of the fingerprint image, based on, at least in part, the first and second order residuals;
   the first-order residuals comprise a difference between respective ridge flow vector values, and an average value of the first-order set of adjacent ridge flow vector values; and
   the second-order residuals comprise a difference between respective average values of the first-order set, and an average value of the second-order set of adjacent first-order values.

2. The system of claim 1, wherein the processor is configured to characterize the quality of the fingerprint image based on, at least in part, a measure of variance of one or both of the first and second order residuals.

3. The system of claim 2, wherein the multi-layer decomposition comprises at least one higher-order residual map of order N>2, based on, at least in part, a lower-order residual map of order N−1.

4. The system of claim 3, wherein the processor is configured to characterize the quality of the fingerprint image based on, at least in part, the measure of variance being below a threshold for the lower order residual map, and above the threshold for the higher-order residual map.

5. An electronic device comprising the fingerprint imaging system of claim 1 in combination with a display window, wherein the fingerprint sensor is comprised within a control mechanism of the electronic device.

6. The electronic device of claim 5, wherein the control mechanism comprises a control button disposed within a cover glass of the electronic device.

7. A method comprising:
acquiring a fingerprint image;
generating an orientation map based on, at least in part, the fingerprint image, the orientation map comprising a set of vector values characterizing a ridge flow pattern of the fingerprint image;
generating a multi-layer decomposition of the orientation map, the decomposition comprising at least first and second order residuals of the vector values, the first order residuals based on, at least in part, the orientation map and the second order residuals based on, at least in part, a first order transformation of the orientation map; and
characterizing a quality of the fingerprint image, based on, at least in part, a measure of variance of the residuals;
wherein:
the first order residuals comprise a difference between respective ridge flow vector values, and an average value of the first order set of adjacent ridge flow vector values; and
the second order residuals comprise a difference between respective average values of the first-order set, and an average value of the second-order set of adjacent first-order values.

8. The method of claim 7, wherein characterizing a quality of the fingerprint image comprises vetoing the image, based on, at least in part, the measure of variance.

9. The method of claim 7, wherein the multi-layer decomposition comprises at least one higher-order residual of order N>2, based on, at least in part, a lower-order residual of order N−1.

10. The method of claim 9, wherein characterizing a quality of the fingerprint image comprises passing the image for user identification, based at least in part on the measure of variance as applied to the higher and lower order residuals.

11. The method of claim 10, further comprising authenticating a user for access to an electronic device, based at least in part on the measure of variance.

12. The method of claim 7, further comprising compressing the fingerprint image to generate a compressed image of the fingerprint, based on, at least in part, at least one of the first and second order residuals.

13. The method of claim 12, further comprising identifying a user based on, at least in part, the compressed image of the fingerprint, absent the orientation map.

14. The method of claim 7, wherein generating the multi-layer residual decomposition comprises determining the first order residuals based on, at least in part, comparison to an average of adjacent vector values.

15. The method of claim 7, wherein:
generating the multi-layer residual decomposition comprises a wavelet transformation of the orientation map; and
characterizing a quality of the fingerprint image comprises determining the measure of variance based on, at least in part, residuals of the wavelet transformation.

16. A mobile device comprising:
a control mechanism configured for controlling operation of the mobile device;
a fingerprint sensor integrated with the control mechanism, the fingerprint sensor configured for capturing a fingerprint image of a user in operation of the mobile device;
a processor in signal communication with the fingerprint sensor, the processor operable to:
generate a ridge flow map based on, at least in part, the fingerprint image, the ridge flow map comprising ridge flow vectors characterizing the fingerprint image;
decompose the ridge flow map into a multi-layer residual mapping, the residual mapping including at least first and second order residuals based on, at least in part, the ridge flow vectors; and
characterize an image quality of the fingerprint image, based on, at least in part, a measure of variance of the residuals;
wherein:
the mobile device is configured for identification and authorization of the user, based at least in part on the image quality; and
the first order residuals comprise a difference between respective ridge flow vector values, and an average value of the first order set of adjacent ridge flow vector values; and
the second order residuals comprise a difference between respective average values of the first-order set, and an average value of the second-order set of adjacent first-order values.

17. The mobile device of claim 16, wherein the control mechanism comprises a control button disposed in a cover glass of the device, and wherein the fingerprint sensor is configured for capturing the fingerprint image of the user in operation of the control button.

18. The mobile device of claim 16, wherein the processor is configured to characterize the image quality based on, at least in part, the measure of variance being below a selected threshold for at least one lower-order residual of order N≤2, and the measure of variance being above the selected threshold for at least one higher-order residual of order N>2.

19. The mobile device of claim 18, wherein the device is configured for identification and authorization of the user based on, at least in part, the measure of variance and the residuals, absent the ridge flow map.

* * * * *